June 6, 1950     A. FREDRIKSON     2,510,880
REVERSIBLE COUPLING
Filed May 29, 1945     3 Sheets-Sheet 1
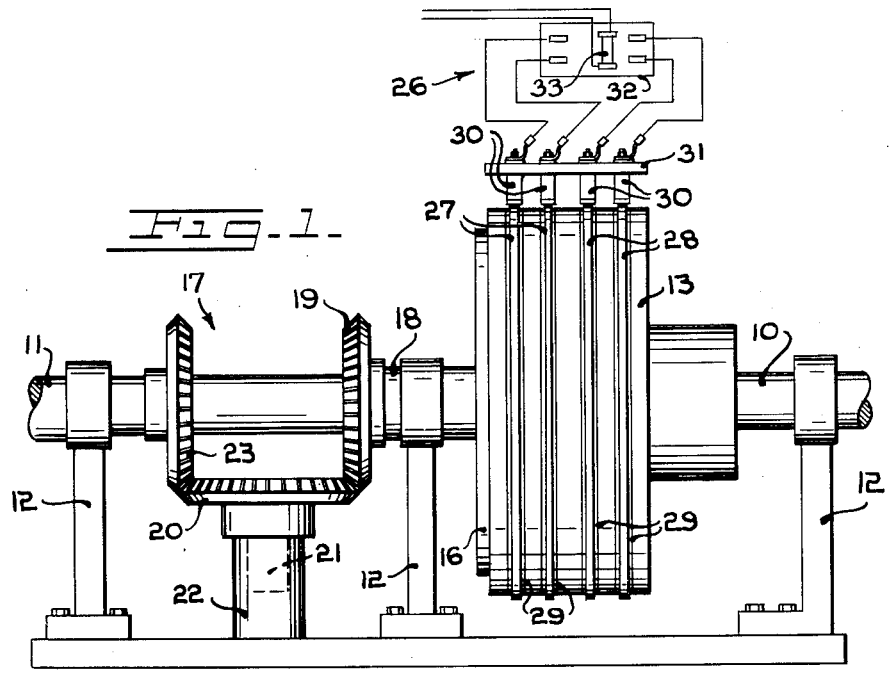
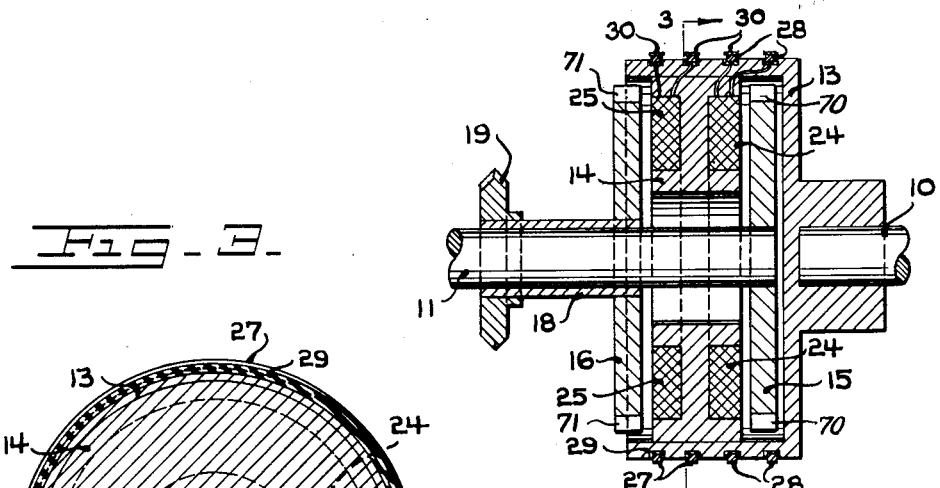
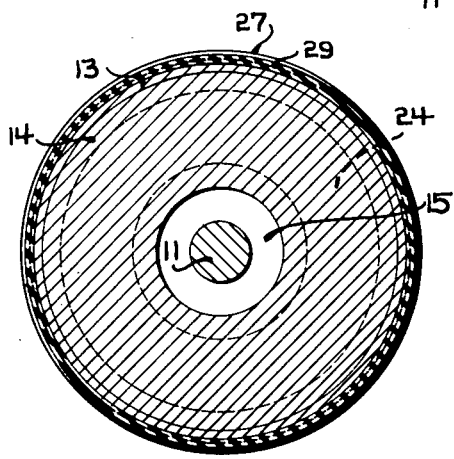
INVENTOR.
Alf Fredrikson
BY
ATTORNEY INVENTOR.
Alf Fredrikson
BY
ATTORNEY June 6, 1950 A. FREDRIKSON 2,510,880
REVERSIBLE COUPLING
Filed May 29, 1945 3 Sheets-Sheet 3

INVENTOR.
Alf Fredrikson
BY
ATTORNEY

Patented June 6, 1950

2,510,880

UNITED STATES PATENT OFFICE 2,510,880

REVERSIBLE COUPLING

Alf Fredrikson, Englewood, N. J.

Application May 29, 1945, Serial No. 596,525

1 Claim. (Cl. 172—284)

This invention relates to new and useful improvements in reversible coupling.

More specifically, the invention proposes the construction of a reversible coupling for a drive shaft and a driven shaft in end alignment with each other to control the driving of said driven shaft in either direction from the drive shaft which is continuously driven in one direction.

Another object of the invention proposes the provision of a housing mounted on the driven shaft and encircling the adjacent end of the drive shaft upon which a pair of discs are disposed with one of said discs being fixed on the shaft and the other being free on the shaft and connected with its shaft by means of a reversing transmission and the provision of an electromagnetic means in the housing for connecting the housing with either of the discs for driving the shafts in the same or reversed directions.

Still another object of the invention proposes characterizing the electro-magnetic means by electro-magnetic coils mounted on an annular member in the housing between the discs with a means for selectively energizing the electro-magnetic coil adjacent either of the discs to employ the force of the magnetic field between the coils and adjacent discs for connecting the coils and discs together for unitary movement.

Still another object of the invention proposes providing the discs with coils arranged adjacent the electro-magnetic coils of the housing, and which are to be energized at the same time with the energization of the adjacent electro-magnetic coils to use the induction principle for connecting the discs to their respective electro-magnetic coils of the housing.

Still another object of the invention proposes the electro-magnetic coils for extending pins from the annular member of the housing to engage complementary openings in the adjacent faces of the discs creating a positive connection of the discs with the housing.

Still another object of the invention proposes the construction of a reversible coupling, electromagnetically controlled, which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a side elevational view of an electromagnetic reversible coupling constructed in accordance with this invention.

Fig. 2 is an enlarged vertical sectional view through the housing of Fig. 1.

Fig. 3 is a sectional view taken on the line 3—3 of Fig. 2.

Figure 4:
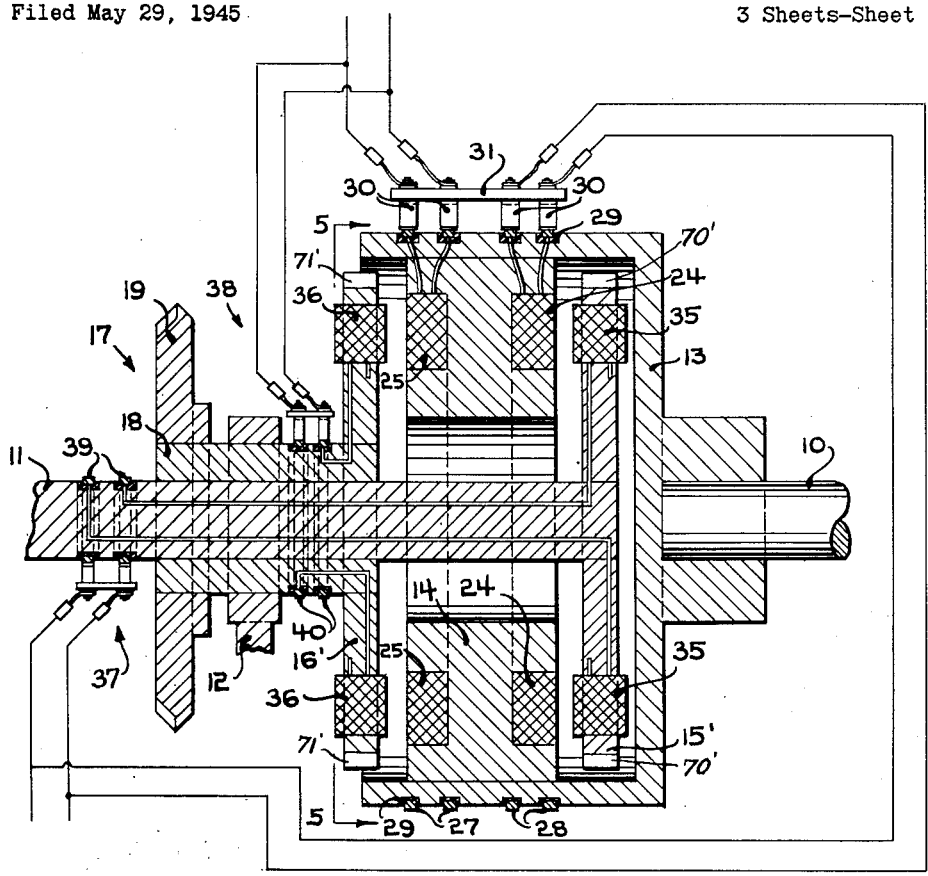
Fig. 4 is a view similar to Fig. 3 but illustrating a modification of the invention.

The reversible coupling according to this invention, includes a drive shaft 10 and a driven shaft 11 supported in suitable brackets 12 in end alignment with each other. A housing 13 is fixedly mounted on the inner end of the drive shaft 10 and concentrically encircles the adjacent end of the driven shaft 11. The housing 13 is provided with an internal annular member 14 arranged coaxially of the shafts 10 and 11. A pair of discs 15 and 16 are disposed on the driven shaft 11 and within the housing 13 and on opposite sides of the annular member 14. The disc 15 is fixedly mounted on the driven shaft 11 and the discs 16 are rotatively freely mounted on the shaft 11 and are connected therewith by a reversing transmission 17. Discs 15 and 16 are both provided with conventional, circumferentially spaced, teeth 70 and 71, respectively, to set up eddy currents.

More specifically, the disc 16 is fixedly mounted on a tubular shaft 18 freely rotative but non-slidably mounted on the driven shaft 11. The reversing transmission 17 for connecting the free disc 16 with the driven shaft 11 includes a beveled gear 19 fixedly mounted on the tubular shaft 18 and which meshes with a second beveled gear 20. This beveled gear 20 is fixedly mounted on a stud shaft 21 rotatively supported in a bracket 22. The beveled gear 20 meshes with a third beveled gear 23 fixedly mounted on the driven shaft 11. Thus when the disc 16 is rotating the transmission 17 will act to convey these rotations to the driven shaft 11.

An electro-magnetic means is provided for connecting the annular member 14 of the housing 13 with one or the other of the discs 15 or 16 for driving the shaft 11 in the same direction as the shaft 10 or in the reversed direction. This electro-magnetic means is characterized by an electro-magnetic coil 24 mounted on the annular member 14 adjacent the disc 15. The opposite face of the annular member 14 is provided with an electro-magnetic coil 25 adjacent the disc 16.

A circuit 26 is provided for suplying current to either of the electro-magnetic coils 24 or 25. This circuit includes two pairs of metallic rings 27 and 28 supported upon the periphery of the housing 13 and insulated therefrom by insulation material 29. These pairs of rings 27 and 28 are engaged by brushes 30 supported on a bracket 31. The brushes 30 are connected by means of wires with a double knife switch 32 which has its pivotal member 33 connected with a source of power not illustrated on the drawings. When the pivoted member 33 is moved to either side, it energizes the coil 24 or the coil 25. When the coil 24 is energized thereby creating a magnetic field coupling the disc 15 to the annular member 14 to rotate therewith and rotate the driven shaft 11 in the same direction as the drive shaft 10. However, when the pivoted member 33 is moved to energize the electro-magnetic coil 25 eddy current will be set up to lock the disc 16 to the annular member 14 and rotate the driven shaft 11 in an opposite direction to the rotation of the drive shaft 10 through the medium of the reversing transmission 17.

Figure 5:
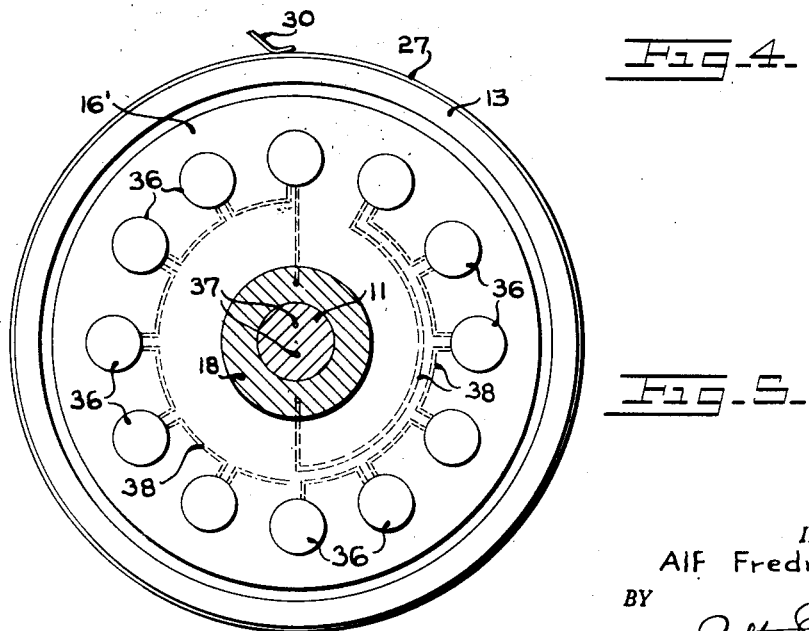
Fig. 5 is a vertical sectional view taken on the line 5—5 of Fig. 4.

In the modification of the invention illustrated in Figs. 4 and 5 a reversing coupling is illustrated which employs locking the induction principle for discs 15' and 16' selectively with the annular member 14 of the housing 13. In this form of the invention the discs 15' and 16', having conventional, circumferentially spaced teeth 70' and 71', are provided with small electro-magnetic coils 35 and 36. The coils 35 of the disc 15' are arranged adjacent the electro-magnetic coil 24 of the annular member 14. The coils 36 of the discs 16' are arranged adjacent the electro-magnetic coil 25 of the annular member 14. Circuits 37 and 38 are provided for energizing the coils 35 and 36 with their respective coils 24 and 25 of the annular member 14.

The circuit 37 which energizes the coils 35 comprises a pair of spaced rings 39 mounted on the driven shaft 11 and connected with the coils 35. These rings 39 are supplied with electric current from the same source that supplies the electro-magnetic coil 24 for energizing the coils 24 and 35.

Likewise the circuit 38 for energizing the coils 36 of the disc 16' includes a pair of spaced rings 40 mounted on the tubular shaft 18 and in turn connected with the coils 36. These rings 40 receive electric current for the coils 36 from the same source that supplies current to the coil 25 to simultaneously energize the coils 25 and 36.

In this form of the invention either of the coils 24 or 25 and the coils of the adjacent discs will be simultaneously energized for selectively coupling either of the discs with the annular member 14 for driving the discs.

In other respects this form of the invention is similar to that previously shown and like reference numerals identify like parts in each of the several views.

It is to be understood that the coils 24 and 25 may be eliminated, and substituted by magnetic coils 35 and 36 on discs 15' and 16' with short circuited windings.

Figure 6:
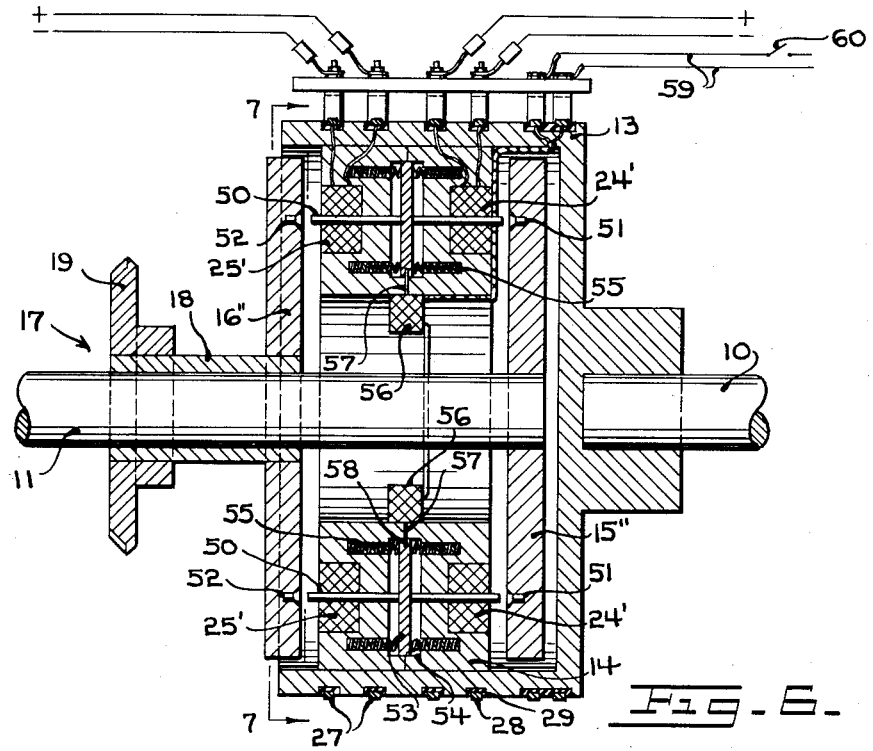
Fig. 6 is another view similar to Fig. 2, but illustrating a still further modification of the invention.
Figure 7:
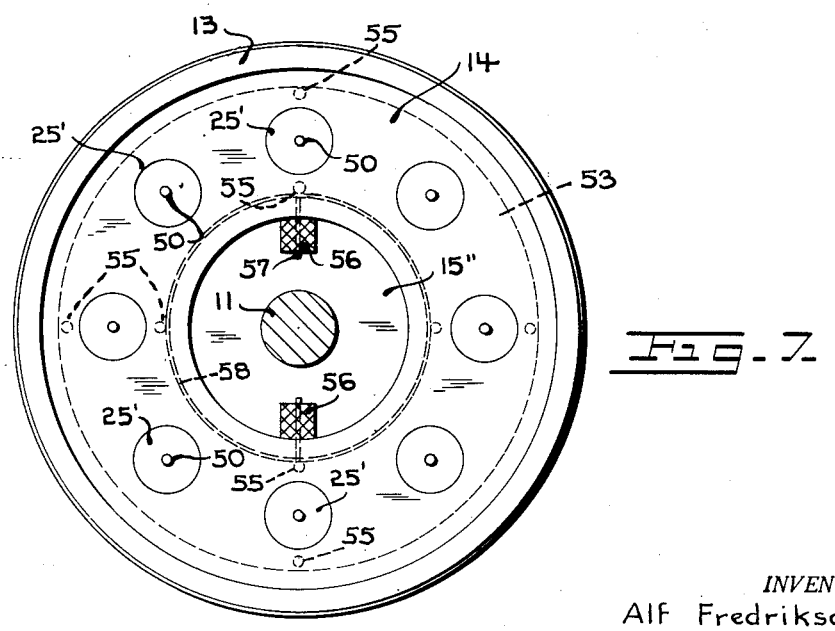
Fig. 7 is a vertical sectional view taken substantially on the line 7—7 of Fig. 6.

In the modification of the invention shown in Figs. 6 and 7 the electro-magnetic coils 24' and 25' are arranged to control the extension of pins 50 from either side of the annular member 14 to engage complementary recesses 51 and 52 formed in the adjacent faces of the discs 15'' and 16''. The pins 50 are securely mounted intermediate of their ends on an annular ring 53 slidably located within a chamber 54 formed in the annular member 14 between the electro-magnetic coils 24' and 25'. Expansion springs 55 engage opposite sides of the ring 53 and urge the ring into a neutral position in which the pins 50 will be disengaged from the openings 51 and 52. These springs 55 only urge the ring 53 into this neutral position when neither of the coils 24' nor 25' is energized and when either of the coils 24' or 25' is energized the pins 50 will be extended moving the ring 53 against the action of the springs 55. In the extended position, the pins 50 will engage in either the openings 51 or 52 for locking the discs 15'' or 16'' to the annular member 14.

Normally eddy currents will be employed to couple the discs 15'' and 16'' to their respective coils 24' and 25'. However, when there are excessive loads on the driven shaft 11 it may be necessary to supplement the action of the eddy current for cupling the discs to the annular member 14. For this reason, means is provided for limiting the action of the pins 50 and permitting them to be used only when excessive loads are carried by the driven shaft 11.

To accomplish this, diametrically opposite coils 56 are mounted on the annular member 14 and have projecting pins 57 for engaging into a complementary groove 58 provided on the inner peripheral edge of the ring 53. The centrifugal action of the rotation of the housing 14 retains the pins 57 in a position to engage the grooves 58 in the disc in position preventing the pins 50 from being extended when either of the coils 24' or 25' is energized. A circuit 59 controlled by a manual switch 60 is provided to energize the coils 56 to withdraw the pins 57 and free the disc 58 so that the pins 50 may be extended from one side or the other of the annular member 14 depending upon which of the coils 24' or 25' is energized. The provision of the circuit 59 permits the coils 56 to be energized at such times as the driven shaft 11 is carrying excessive loads and it becomes necessary to supplement the action of the coils 24' and 25' to insure the coupling of the discs 15'' and 16'' to the annular member 14 of the housing 13.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A multiple clutch including a drive shaft and a driven shaft in end alignment with each other and comprising, a housing mounted on said drive shaft and having an internal, annular member, electromagnetic coils mounted on opposite sides of said annular member, a disc fixedly mounted on said driven shaft for rotation therewith and positioned adjacent one of said coils, a second disc mounted on said driven shaft for free rotation thereon, said second disc being positioned adjacent the other of said coils, means interconnecting said second disc with said driven shaft, said discs being provided with a plurality of openings on their respective sides adjacent each of said electromagnetic coils, a plurality of pins slidably mounted on said annular member and selectively engageable with the openings formed in either of said discs, said pins being selectively actuated by energization of either of said electromagnetic coils to engage within the openings of said disc adjacent said energized coil, and electromagnetic means for maintaining said pins out of engagement with either of said discs when said electromagnetic coils on said annular member are deenergized.

ALF FREDRIKSON.

REFERENCES CITED

The following references are of record in the file of this patent:

UNITED STATES PATENTS

| Number | Name | Date |
|---|---|---|
| 865,997 | Churchward | Sept. 17, 1907 |
| 924,404 | Van Dyke et al. | June 8, 1909 |
| 1,169,937 | Dikeman | Feb. 1, 1916 |
| 1,265,078 | Grote | May 7, 1918 |
| 1,548,016 | Riboisiere | July 28, 1925 |
| 1,909,918 | Tanner | May 16, 1933 |
| 1,980,656 | Barnett | Nov. 13, 1934 |
| 2,077,663 | Batten | Apr. 20, 1937 |
| 2,120,734 | Cotal | June 14, 1938 |
| 2,125,433 | Dunkelow | Aug. 2, 1938 |